Nov. 29, 1955 D. D. GRIEG ET AL 2,725,535

ATTENUATORS

Filed May 31, 1951 2 Sheets-Sheet 1

INVENTORS
DONALD D. GRIEG
HERBERT F. ENGELMANN
JOHN A. KOSTRIZA
BY
Percy P. Lantzy
ATTORNEY Nov. 29, 1955 D. D. GRIEG ET AL 2,725,535

ATTENUATORS

Filed May 31, 1951 2 Sheets-Sheet 2

INVENTORS
DONALD D. GRIEG
HERBERT F. ENGELMANN
JOHN A. KOSTRIZA
BY [signature]
ATTORNEY United States Patent Office 2,725,535

Patented Nov. 29, 1955

2,725,535

ATTENUATORS

Donald D. Grieg, North Caldwell, and Herbert F. Engelmann, Mountain Lakes, N. J., and John A. Kostriza, New Dorp, N. Y., assignors to International Telephone and Telegraph Corporation, a corporation of Maryland Application May 31, 1951, Serial No. 229,172

2 Claims. (333—81)

This invention relates to radio frequency transmission systems and more particularly to attenuators for transmission systems adapted to propagate microwave energy.

In the copending application of D. D. Grieg-H. F. Engelmann, Serial No. 227,896, filed May 23, 1951, a new type of microwave transmission system is disclosed. The new system employs two conductors, one as a "ground conductor" and the other as a "line conductor" spaced close together in substantially parallel relation. The so called "ground conductor," which may be at a given potential with reference to ground, is chosen wider than the line conductor so that the surface thereof provides an image reflection of the line conductor, whereby the distribution of the electric and magnetic fields between the conductors is substantially the same as the distribution between one conductor and the neutral plane of a two-conductor parallel system. Any irregularities that occur in the line conductor is reflected in its image so that the distribution of the electric and magnetic fields remains substantially constant insofar as the surface of the ground conductor is concerned. Small variations in size and shape of the line conductor may produce variations in the characteristic impedance of the system but the field distribution with respect to the ground conductor is not materially disturbed. Likewise, certain variations in the surface of the ground conductor do not disturb the field distribution with respect to the surface thereof since such variations either neutralize each other or do not adversely effect the image of the line conductor. By this system, microwaves can be easily propagated along the line-ground conductor system since the microwaves flow in the regions of the electromagnetic field bounded by the opposed surfaces of the line and ground conductors. This propagation of microwave energy takes place regardless of whether or not the space between the two conductors is open or occupied by a solid dielectric material such as is the case where printed circuit techniques are used.

One of the objects of the invention is to provide attenuators for such microwave transmission systems; and a further object is to make such attenuators adjustable.

One of the features of the invention is to provide an attenuator which will intercept more or less of the flux about the line conductor, either between the line conductor and the ground conductor, along one or both sides of the line conductor or in overlying relation with respect to the line conductor. Where the line conductor is provided with an open space between it and the ground conductor, an attenuator device may be provided for adjustable positioning therebetween, thus intercepting the flux where it is most dense.

In other conductor arrangements it may be impractical to provide for insertion of an attenuator device between the two conductors. In such arrangements, the attenuator may be positioned adjacent the line conductor either to one side or in overlying relation. When the attenuator device is used adjacent the upper half of the line conductor where the flux density is small, the device may be elongated so as to intercept the electromagnetic field the required amount.

In still other arrangements, the conductivity of the system may be modified by either the insertion of a section of a conductor having a higher resistivity than the line and ground conductors, or sections of such conductors may be provided with a skin-depth plating of resistive material.

The above-mentioned and other features and objects of this invention and the manner of attaining them will become more apparent and the invention itself will be best understood, by reference to the following description of an embodiment of the invention taken in conjunction with the accompanying drawings, wherein.

Figures 1, 2, 3, 4, 5, 6, 7, 8, 9, 10, 11:
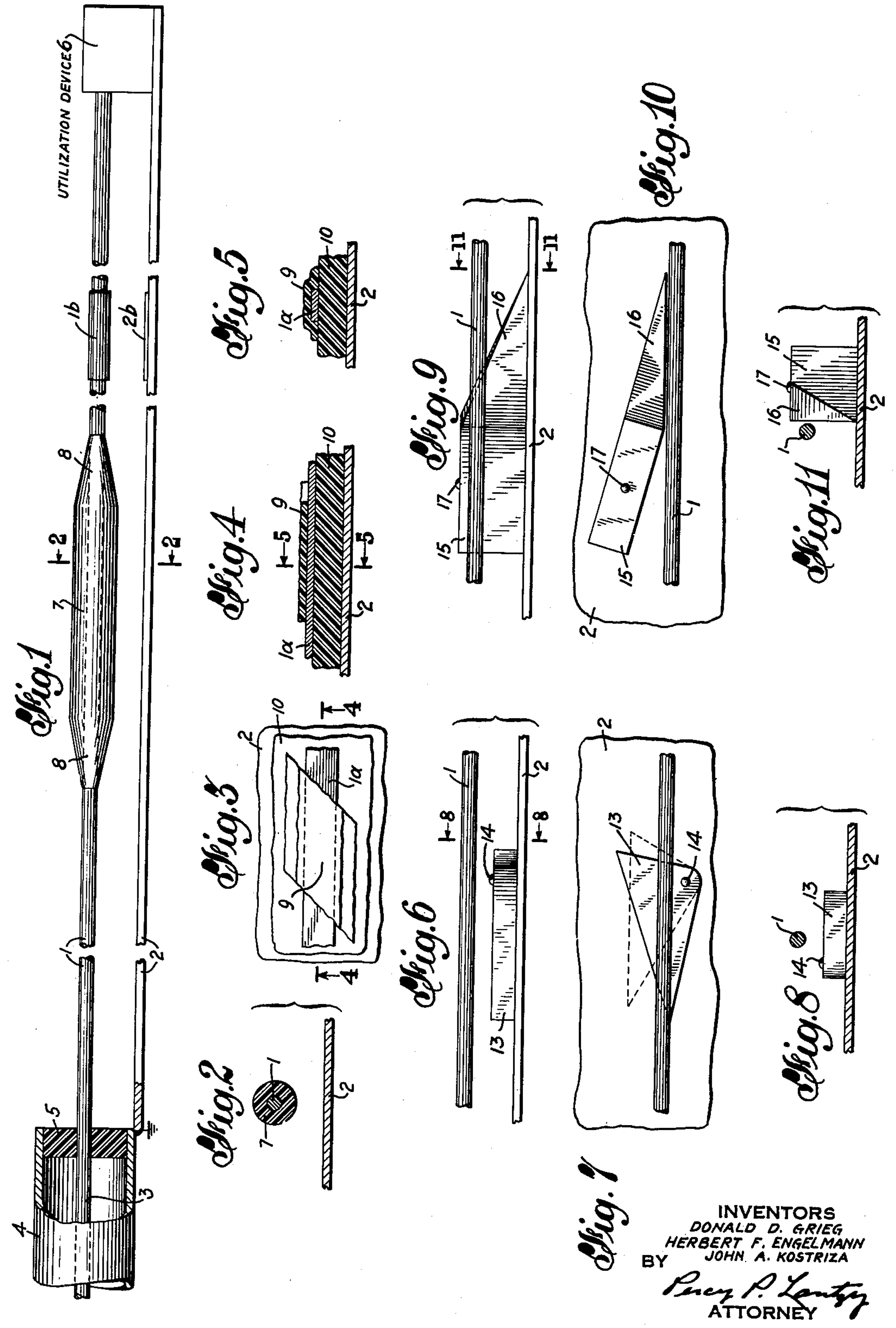
Fig. 1 is a view in side elevation with parts broken away showing one embodiment of the invention.
Fig. 2 is a view in cross-section taken along line 2—2 of Fig. 1.
Figure 12:
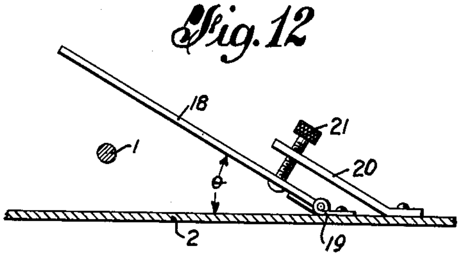
Figure 13:
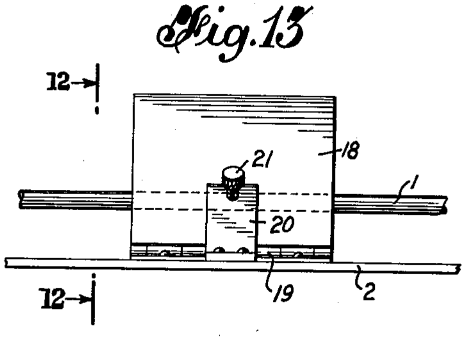
Figure 14:
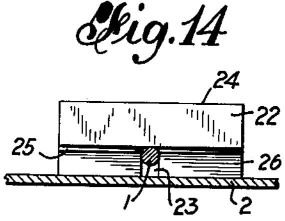
Figure 15:
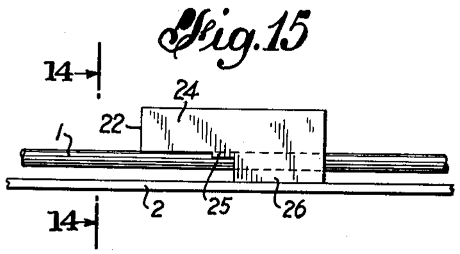
Figure 16:
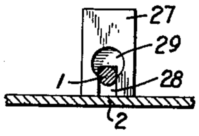
Figure 17:
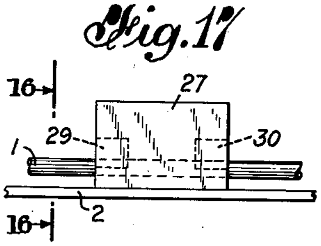
Figure 18:
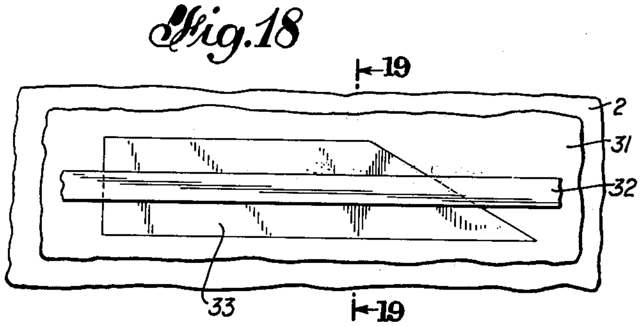
Figure 19:
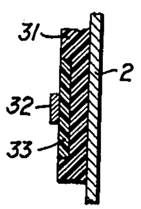

Figs. 3, 4 and 5 are plan, longitudinal and cross-wise sectional views of a second embodiment, the views of Figs. 4 and 5 being taken along lines 4—4 and 5—5 of Figs. 3 and 4, respectively;

Figs. 6, 7 and 8 are side elevational, plan and cross-sectional views, respectively, of a third embodiment, the cross-sectional view of Fig. 8 being taken on line 8—8 of Fig. 6;

Figs. 9, 10 and 11 are side elevational, plan and cross-sectional views, respectively, of a fourth embodiment, the cross-sectional view of Fig. 11 being taken along line 11—11 of Fig. 9;

Figs. 12 and 13 are end and side views of a further form of attenuator device, the view of Fig. 12 being taken substantially along line 12—12 of Fig. 13;

Figs. 14 and 15 are end and side views of another embodiment, the end view of Fig. 14 being taken along line 14—14 of Fig. 15;

Figs. 16 and 17 are end and side views of still another embodiment, the end view of Fig. 16 being taken along line 16—16 of Fig. 17; and Figs. 18 and 19 are plane and sectional views of a further embodiment, the sectional view of Fig. 19 being taken along line 19—19 of Fig. 18.

Referring to Figs. 1 and 2 of the drawing, the microwave transmission system for which the attenuators of this invention are provided comprises a first or line conductor 1 and a second or ground conductor 2. The ground conductor 2 is preferably of sheet or ribbon form, although other forms may be used, having a width greater than the width of the line conductor 1. The conductor 2, for example, may comprise one of the walls of the chassis or other part of the electric apparatus with which or in which the transmission system is used. As indicated in Fig. 2, the ground conductor 2 could extend a considerable distance laterally with respect to the line conductor, and in fact might be regarded as extending to infinity as an ideal ground conductor. For practical purposes, however, the width of the ground conductor should be at least twice or three times the width of the line conductor. The purpose of having the ground conductor of a width greater than the width of the line conductor is to provide an image reflection of the line conductor so that the distribution of the electric and magnetic fields between the conductors 1 and 2 is substantially the same as the distribution between one conductor and the neutral plane of a two-conductor parallel system. By making the spacing of the two conductors 1 and 2 small, for example, a fraction of the wavelength of the mean frequency of the microwave energy propagated over such system, the flux distribution is concentrated almost entirely between the opposed surfaces thereof with only a small distribution about the upper half of the line conductor.

For propagation of microwave energy over the conductor system 1, 2, a coaxial line comprising an inner conductor 3 and an outer conductor 4 is shown, by way of example only, wherein the inner conductor 3 is connected to the line conductor 1 and the outer conductor 4 is connected to the ground conductor 2. For matching purposes, lossy material 5, which may contain graphite or other conduction material, is provided in the form of a bead closing the end of the coaxial line about the inner conductor 3. The length of the body 5 is determined by the characteristics of the material thereof and the amount of matching required. The microwaves are propagated from the coaxial line to and through the electromagnetic field established between the conductor 1 and the ground conductor 2. The propagatoin of this microwave energy may be branched off from the system 1, 2 or applied to some associated utilization device such as indicated at 6.

While the propagation of microwaves along the line and ground conductor combination is confined substantially within the electromagnetic field bounded by the opposed surfaces of the two conductors, attenuation thereof may be obtained by inserting lossy material into the field either between the conductors or at some point about the line conductor or by changing the conductive quality of one or both of the conductors 1 and 2. In Fig. 1, for example, a coating 7 of lossy material is shown about a section of the conductor 1. In this example, the lossy material cuts the electric field about the conductor 1 throughout the 360° thereabout. This coating may be in the form of a lossy dielectric such as one of the phenolic dielectrics, certain paints, enamels, or a lossy conductor such as aquadag, iron or resistive alloy, and preferably is so applied as to provide a gradual taper at the ends thereof, for matching as indicated at 8.

If desired, either or both the line conductor and the ground conductor may be made with one or more sections of lossy conductive material such as iron or a resistive alloy. In Fig. 1, conductors 1 and 2 are plated at 1*b* and 2*b* with a skin-depth of nickel or carbon steel, thus providing lossy sections for the high frequency current. This plating, of course, need only be on one of the conductors if desired. Also, the entire cross-section of the conductor section may comprise a resistive conductor.

In Figs. 3, 4 and 5, the lossy material is shown in the form of a layer 9 placed over the conductor 1*a*, the conductor 1*a* being ribbon-like and supported on a layer 10 of dielectric material in a manner known in the art of "printed circuits." The layer 9 may be painted or otherwise applied according to printed circuit technique over the conductor 1*a* and along side thereof as indicated in Figs. 3 and 5. The ends of the layer 9 are preferably tapered as indicated at 12 to avoid an abrupt attenuation.

In the embodiment of Figs. 6, 7 and 8, the attenuator device 13 is shown in triangular form pivoted at one corner as indicated at 14. By pivotally adjusting the device 13 more or less of the lossy material thereof may be brought beneath the line conductor thus cutting more or less of the flux to the degree desired.

The embodiment shown in Figs. 9, 10 and 11, is similar to that shown in Figs. 6, 7 and 8 except that the main body 15 thereof extends along side of the line conductor and thereabove. One end portion of the body 15 is tapered as indicated at 16. The body is pivoted at 17 so that the position thereof may be varied with respect to the line conductor 1. The pivot 17 may obviously be positioned at any selected point along the length of the body 15 as may be desired.

The embodiment shown in Figs. 12 and 13 comprises a sheet of lossy material 18 such as lossy phenolic resin, which is hinged or otherwise pivoted at 19 to the ground conductor 2 at a distance laterally of the conductor 1. A bracket 20 is provided with a threaded thumb piece 21 whereby the angular position of the sheet of material 18 with respect to the line conductor 1 may be adjusted. By positioning the sheet 18 in close overlying position with respect to the conductor 1, a maximum attenuation is obtainable. By widening the space between the conductor 1 and the sheet 18, a lesser degree of attenuation is obtainable. For unit longitudinal length, the attenuation is a function of the thickness of the sheet 18, the overall width of the sheet, the amount the sheet extends out beyond the conductor 1 and the size of the angle $\theta$. This form produced some radiation at the open side, especially when the angle $\theta$ was large.

In the embodiment shown in Figs. 14 and 15, a body of lossy material 22 is provided with a rectangular recess 23 adapted to receive the conductor 1 when the body 22 is placed thereover. The body 22 and the recess 23 are of such size that the body 22 may rest upon the ground conductor 2. As shown in Fig. 15 the upper portion of the body 22 may extend, as indicated at 24, lengthwise of the conductor 1 for any desired distance. A stepped portion 25 is provided between the extended portion 24 and the legs 26 for matching purposes thus reducing the degree of wave perturbation.

The embodiment of Figs. 16 and 17 is similar to that shown in Figs. 14 and 15 in that the body of lossy material 27 is provided with a recess 28 in its bottom wall by which the body may be placed in overlying relation with the line conductor 1 with the opposite sides resting upon the ground conductor 2. Recesses 29 and 30 are provided adjacent the ends of the recess 28 for matching purposes. This form of attenuator is wide band and is bilaterally matched.

In the embodiment shown in Figs. 18 and 19, the ground conductor 2 is provided with a layer 31 of dielectric material, which may comprise polyethylene, polystyrene "Teflon" or "Bakelite." The line conductor 32 is preferably a ribbon type of conductor which may be formed by a stamping process or by one of the printed circuit methods. The layer of lossy material 33 is contained in the layer of dielectric adjacent of the conductive material 32. One or both ends of the body of lossy material 33 is bevelled or inclined with respect to the axis of the conductor 32 for matching purposes. If desired the layer of dielectric can be made lossy by utilizing a section of lossy insulation, or the lossy material may be in the form of a separate layer adjacent either the line conductor or the ground conductor.

While we have described above the principles of our invention in connection with specific apparatus, it is to be clearly understood that this description is made only by way of example and not as a limitation to the scope of our invention, as set forth in the objects thereof and in the accompanying claims.

The species of the present invention illustrated in Figs. 6–8 and 18 and 19 are covered in a separate divisional application.

We claim:

1. In a microwave transmission system, the combination of a microstrip line having a first planar conductor, a second planar conductor wider than the first planar conductor, extending parallel thereto and lying in a parallel plane, and a layer of solid dielectric between said first and second planar conductors of a thickness electrically equal to a fraction of a wavelength at the mean frequency of the microwave energy propagated along said microstrip line so that the main electromagnetic field is distributed between the opposed surfaces of said conductors with a fringe field extending from the side edges of said first conductor and the top portions thereadjacent towards said second conductor; with a body of lossy material disposed above and resting on said first conductor and extending therealong, and having portions extending beyond the side edges of said first conductor into said fringe field to thereby produce attenuation of the wave propagated along said microstrip line.

2. A microwave transmission system according to claim 1, wherein said body of lossy material has additional portions extending along and abutting the side edges of said first conductor to thereby intercept more of said fringe field and produce additional attenuation.

References Cited in the file of this patent

UNITED STATES PATENTS

| | | |
|---|---|---|
| 2,409,449 | Sanders et al. | Oct. 15, 1946 |
| 2,464,277 | Webber | Mar. 15, 1949 |
| 2,515,228 | Hupcey | July 18, 1950 |
| 2,538,771 | Feenberg | Jan. 23, 1951 |
| 2,567,210 | Hupcey | Sept. 11, 1951 |
| 2,611,822 | Bliss | Sept. 23, 1952 |
| 2,670,461 | Learned | Feb. 23, 1954 |

OTHER REFERENCES

"Reference Data for Radio Engineers," Federal Telephone and Radio Corporation, August 1949, Knickerbocker Printing Corp., N. Y. (Copy in Division 69.)